United States Patent
Kim (10) Patent No.: US 9,228,607 B2
(45) Date of Patent: Jan. 5, 2016

(54) LINEAR MOTION GUIDE

(71) Applicant: Samsung Display Co., Ltd., Yongin, Gyeonggi-Do (KR)

(72) Inventor: Min-Ho Kim, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 191 days.

(21) Appl. No.: 14/027,757

(22) Filed: Sep. 16, 2013

(65) Prior Publication Data

US 2014/0346304 A1    Nov. 27, 2014

(30) Foreign Application Priority Data

May 27, 2013   (KR) .................. 10-2013-0059790

(51) Int. Cl.
*F16C 17/00*    (2006.01)
*F16C 29/00*    (2006.01)
*B23Q 1/01*    (2006.01)

(52) U.S. Cl.
CPC ............. *F16C 29/001* (2013.01); *F16C 29/004* (2013.01); *B23Q 1/017* (2013.01)

(58) Field of Classification Search
CPC .... F16C 29/004; F16C 29/001; F16C 29/005; F16C 29/008; F16C 29/12; F16M 11/24; B23Q 1/017

USPC ............. 384/8, 9, 26, 37, 38, 40, 57; 248/157
See application file for complete search history.

(56) References Cited

U.S. PATENT DOCUMENTS

| 4,626,299 | A | * | 12/1986 | Knight et al. | ................... 384/39 |
| 6,457,864 | B1 | * | 10/2002 | Chang et al. | ..................... 384/9 |
| 7,004,007 | B2 | * | 2/2006 | Kruger et al. | ..................... 384/9 |

FOREIGN PATENT DOCUMENTS

| JP | 11-048257 A | 2/1999 |
| KR | 1020070115576 A | 12/2007 |
| KR | 1020080069873 A | 7/2008 |
| KR | 1020120069360 A | 6/2012 |

* cited by examiner

*Primary Examiner* — James Pilkington
(74) *Attorney, Agent, or Firm* — Cantor Colburn LLP (57) ABSTRACT

A linear motion guide includes a guide rail disposed on a floor, a block movably mounted on the guide rail, a height adjustment module disposed between the guide rail and the floor, where the height adjustment module includes a support disposed on the floor to support the guide rail and a heating unit heating the support, where a gap between the floor and the guide rail is adjusted as the support is thermally heated by the heating unit.

15 Claims, 7 Drawing Sheets

LINEAR MOTION GUIDE

This application claims priority to Korean Patent Application No. 10-2013-0059790 filed on May 27, 2013, and all the benefits accruing therefrom under 35 U.S.C. §119, the entire contents of which are incorporated herein by reference.

BACKGROUND

1. Field

The invention generally relates to a linear motion guide which precisely adjusts a height of a guide rail.

2. Description of the Related Art

In general, a linear motion ("LM") guide is a mechanical element that is mounted on machine tools including a stator and a carrier smoothly moving in a straight line on the stator.

The LM guide is usually used for a precise operation, in which an installation precision of the LM guide is about 100 micrometers (μm) and a limit of a vertical precision of a block that is disposed on a rail is about 10 μm to about 20 μm.

An installation height of an LM guide rail can be adjusted by about 20 μm to about 30 μm using a thin metal layer, i.e., a liner, for a precise adjustment of the installation height.

SUMMARY

The exemplary embodiments of the invention have been made in an effort to provide a linear motion ("LM") guide having advantages of being able to precisely adjust the height of a guide rail.

An exemplary embodiment of the invention provides an LM guide that includes a guide rail disposed on a floor and a block movably mounted on the guide rail, a height adjustment module disposed between the guide rail and the floor, and the height adjustment module includes a support disposed on the floor to support the guide rail and a heating unit heating the support where a gap between the floor and the guide rail is adjusted as the support is thermally heated by the heating unit.

A support plate supporting the guide rail may be disposed under the guide rail.

A plurality of height adjustment modules may be provided and arranged at predetermined intervals along a longitudinal direction of the guide rail.

The support may have a cylindrical shape.

The support may include at least one of Invar, Superinvar, Kovar® and Inconel.

The heating unit may include a coil disposed around the support.

The height adjustment module may further include a cover that covers the support and the coil to effectively prevent heat transferred from the coil to the support from being dissipated to an outside.

The height adjustment module may be configured to calculate a change in the length of the support, using a volume of the support, a thermal expansion coefficient of the support and an information on an increase in temperature of the heating unit.

The LM guide may further include a height measuring unit that is disposed on the block and can measure a change in height in the extension direction of the guide rail, in an extension direction of the guide rail.

The height measuring unit may include at least one of a contact gauge and a non-contact displacement sensor.

The height adjustment module may adjust the length of the support at a section where the height changes, using the change in height measured by the height measuring unit.

The LM guide according to an exemplary embodiment of the invention can easily adjust the height of a guide rail.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

There is a problem in a typical linear motion ("LM") guide that it is difficult to install and adjust the LM guide with an exquisite precision of several micrometers.

Hereinafter, exemplary embodiments will be described in detail with reference to the accompanying drawings such that those skilled in the art can easily achieve the exemplary embodiments. As those skilled in the art would realize, the described embodiments may be modified in various different ways, all without departing from the spirit or scope of the invention.

The unrelated parts to the description of the exemplary embodiments are not shown in the drawings to make the description clear and like reference numerals designate like element throughout the specification.

The size and thickness of the components are free in the drawings for the convenience of description and the invention is not limited thereto.

Throughout the specification, unless explicitly described to the contrary, the word "comprise" and variations such as "comprises" or "comprising," will be understood to imply the inclusion of stated elements but not the exclusion of any other elements. The term "on/above" used throughout the specification means "on/above or beneath/under" the object and it does not mean "vertically upward".

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or."

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Hereinafter, a configuration of an LM guide 1 according to an exemplary embodiment of the invention will be described in detail with reference to the drawings.

Figure 1:
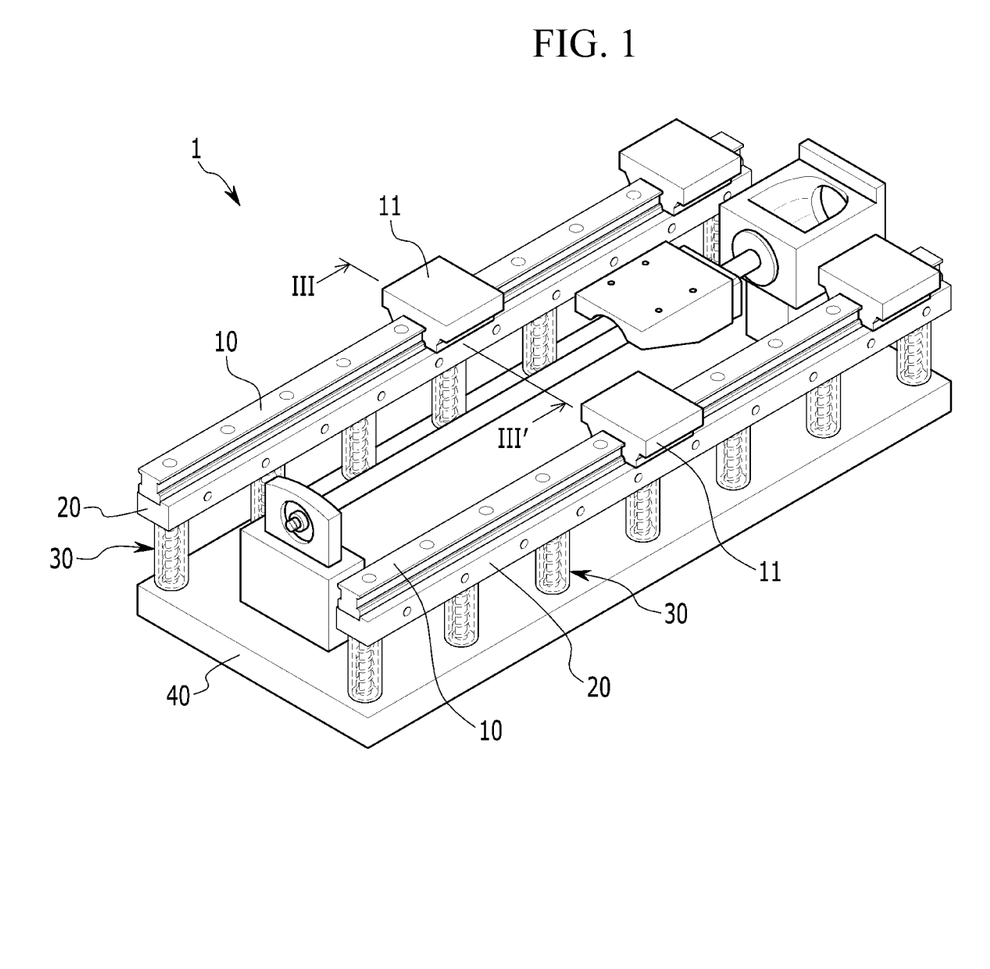
FIG. 1 is a perspective view of a linear motion ("LM") guide according to an exemplary embodiment of the invention.
Figure 2:
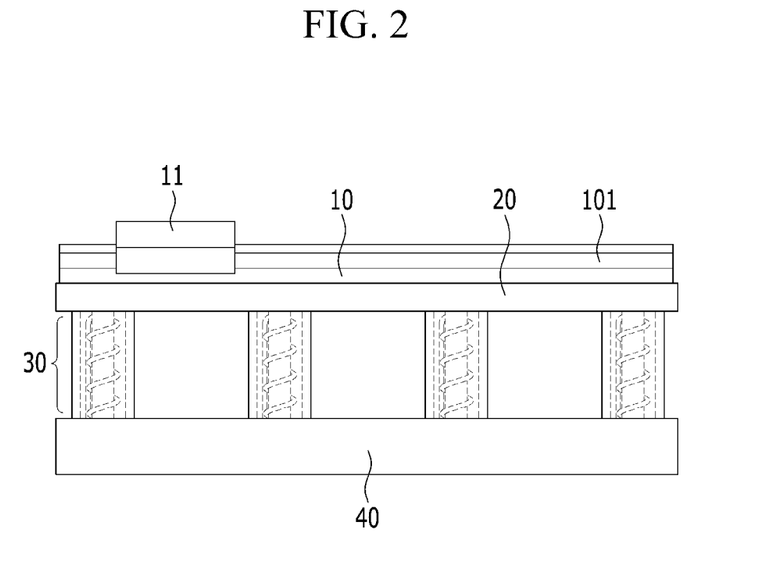
FIG. 2 is a cross-sectional view of the LM guide according to an exemplary embodiment of the invention, seen in a longitudinal direction.

FIG. 1 is a perspective view of an LM guide 1 according to an exemplary embodiment of the invention. FIG. 2 is a cross-sectional view of the LM guide 1 according to an exemplary embodiment of the invention, seen in a longitudinal direction.

The LM guide 1 according to an exemplary embodiment of the invention was designed to more easily and accurately adjust a height of a guide rail 10.

The LM guide 1 is mounted on machine tools for a smooth motion in a substantially straight line.

Machine tools are designed to make it possible to machine a workpiece by moving a tool fixed to a tool post forward/backward or left/right to bring the tool in contact with the workpiece. Here, it is an important factor to accurately bring a tool in contact with a position where a workpiece is machined. Particularly, in micro machine tools, a higher straightness is required for the guide rail 10 of the LM guide 1.

Accordingly, the exemplary embodiment has been designed to keep straightness of the guide rail 10 by more easily adjusting the height of the guide rail 10 and simultaneously measuring a fine displacement for more accurate adjustment.

Referring to FIGS. 1 and 2, the LM guide 1 according to an exemplary embodiment of the invention may include guide rails 10, blocks 11, and height adjustment modules 30.

First, the guide rails 10 are components where the blocks 11 are mounted, which will be described below in detail.

The guide rail 10 longitudinally extends in a substantially straight line. A guide groove 101 is longitudinally provided on both sides of the guide rail 10.

In the illustrated exemplary embodiment, the guide rails 10 are disposed above a floor 40, and support plates 20 may be disposed under the guide rails 10 to support the guide rails 10, as shown in FIGS. 1 and 2.

The blocks 11 are fitted on the guide rails 10 to move along the guide rails 10.

The blocks 11 are fitted in both sides of the guide rails 10 from above the guide rails 10 and moved forward/backward longitudinally along guide grooves 101 by a driving unit (not shown).

The guide rail 10 and the block 11 of the LM guide 1 are included in a common technical configuration and the detailed description will be omitted.

The height adjustment module 30 is disposed between the guide rail 10 and the floor 40, and the height adjustment module 30 adjusts a gap between the guide rail 10 and the floor 40.

Referring to FIGS. 1 and 2, in an exemplary embodiment, a plurality of height adjustment modules 30 may be provided.

In the illustrated exemplary embodiment, the plurality of height adjustment modules 30 may be arranged at predetermined intervals along the longitudinal direction of the guide rail 10.

In an exemplary embodiment, the height adjustment modules 30 may be separately adjusted with different height levels, respectively, by control orders of a controller (not shown).

Although the plurality of height adjustment modules 30 is provided in the illustrated exemplary embodiment, it may be possible to make the height adjustment modules 30 in a single module for a fine adjustment of heights of each part.

A detailed configuration of the height adjustment module 30 will be described hereafter in detail with reference to the drawings.

Figure 3:
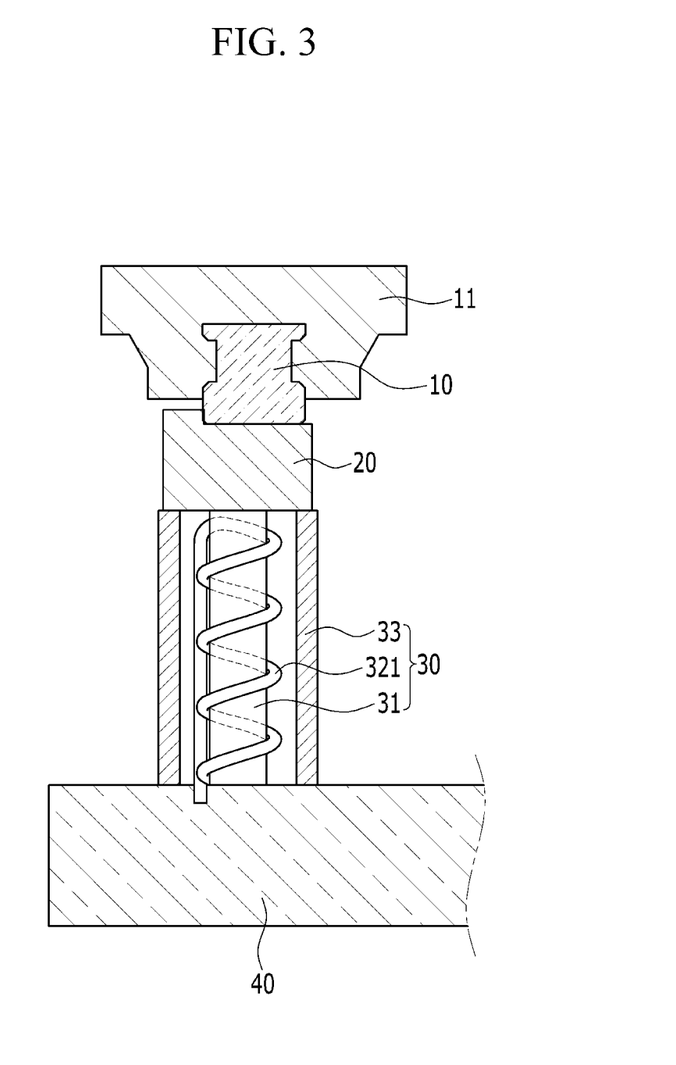
FIG. 3 is a cross-sectional view showing a portion taken along line III-III' in FIG. 1.
Figure 4:
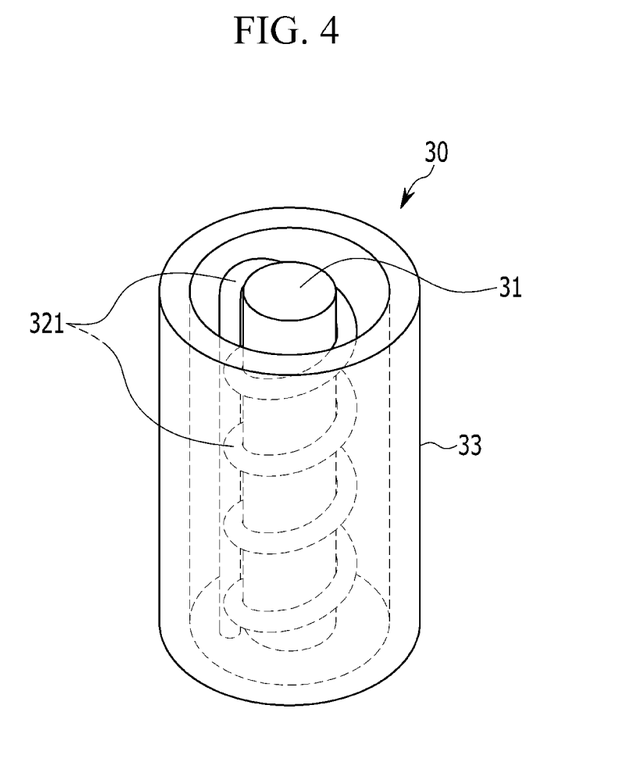
FIG. 4 is a perspective view showing a height adjustment module according to an exemplary embodiment of the invention.
Figure 5:
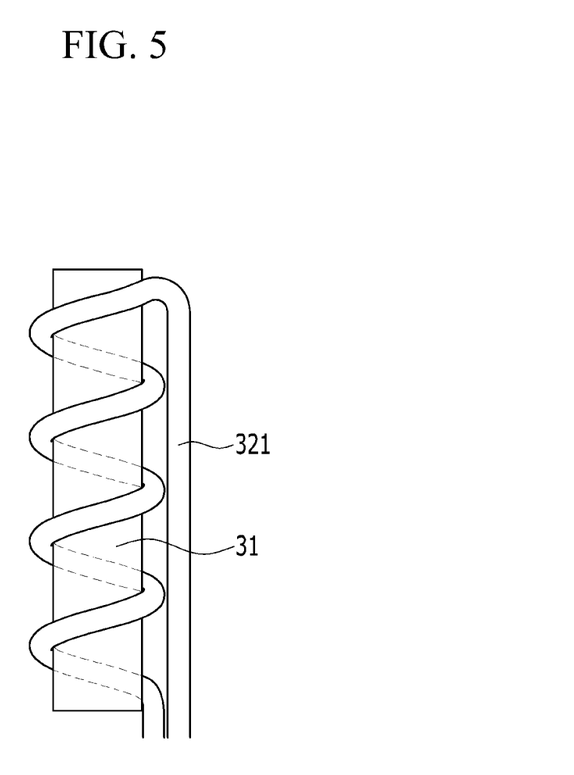
FIG. 5 is a perspective view showing a support and a heating unit of the height adjustment module according to an exemplary embodiment of the invention.
Figure 6:
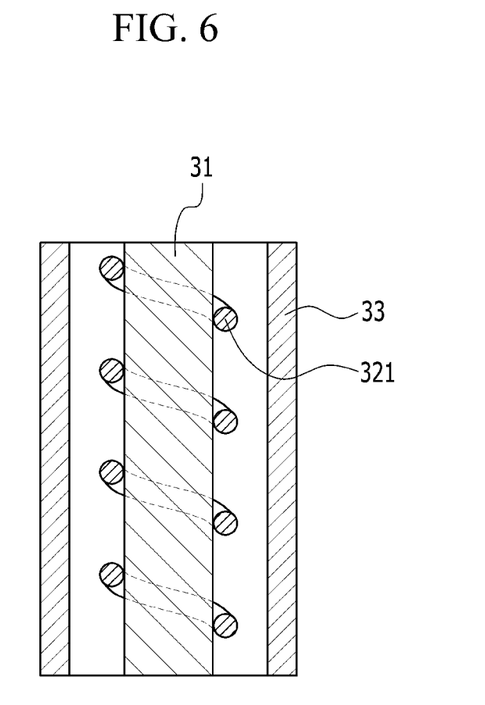
FIG. 6 is a cross-sectional view showing the height adjustment module according to an exemplary embodiment of the invention.

FIG. 3 is a cross-sectional view showing a portion taken along line III-III' in FIG. 1. FIG. 4 is a perspective view showing a height adjustment module 30 according to an exemplary embodiment of the invention. FIG. 5 is a perspective view showing a support 31 and a heating unit including a coil 321 of the height adjustment module 30 according to an exemplary embodiment of the invention. FIG. 6 is a cross-sectional view showing the height adjustment module 30 according to an exemplary embodiment of the invention.

Referring to FIG. 3, the height adjustment module 30 may include the support 31, a heating unit including the coil 321, a cover 33, and a controller (not shown) in the illustrated exemplary embodiment.

First, the support 31 is a substantial component supporting the guide rail 10, and adjusts the gap between the guide rail 10 and the floor 40.

Although the support 31 shown in FIG. 3 has a cylindrical shape in the illustrated exemplary embodiment, the invention is not limited thereto, and the support 31 may have various types of shapes.

Referring to FIG. 3, the support 31 is disposed to support the guide rail 10 in the illustrated exemplary embodiment.

Although the support plate 20 is disposed under the guide rail 10 and thus the support 31 supports the guide rail 10 by supporting the support plate 20 in the illustrated exemplary embodiment shown in FIG. 3, the support 31 may be disposed to support the guide rail 10 even when the support plate 20 is not provided. That is, in an exemplary embodiment, the support 31 may directly support the guide rail 10 when the support plate 20 is not provided.

In the illustrated exemplary embodiment, the support 31 thermally expands while being heated by the heating unit which will be described below in detail, such that the support 31 adjusts the gap between the guide rail 10 and the floor 40.

In an exemplary embodiment, the support 31 may include a material having a relatively small thermal expansion coefficient for fine adjustment of the gap between the guide rail 10 and the floor 40.

The material may include Invar, Superinvar, Kovar® and Inconel, for example.

However, the invention is not limited thereto, and the support 31 may include a material having a relatively large thermal expansion coefficient. In an exemplary embodiment, even when the support 31 includes the material having a relatively large thermal expansion coefficient, it is still possible to adjust the gap between the guide rail 10 and the floor 40 by adjusting an amount of an increase in temperature.

The heating unit is provided to heat the support 31.

The heating unit may include a coil 321 and a power unit (not shown) in the illustrated exemplary embodiment.

Referring to FIGS. 4 and 5, the coil 321 is disposed around the support 31 in the illustrated exemplary embodiment.

The power unit (not shown) is connected to ends of the coil 321 to supply electricity.

In an exemplary embodiment, the power unit may be also connected to the controller (not shown), which will be described below in detail, such that the power unit supplies a small amount of electricity to the coil 321 in response to a control order from the controller.

Although the power unit is not shown in the figures, it may be disposed in and/or on the floor 40 or may be disposed outside of the floor 40.

The cover 33 covers the support 31 and the coil 321.

Referring to FIGS. 4 and 6, in the illustrated exemplary embodiment, since the cover 33 covers the support 31 wound by the coil 321, it effectively prevents heat transferred from the coil 321 to the support 31 from being dissipated to an outside of the cover 33 or effectively prevents external air from flowing inside of the cover 33.

Although the cover 33 has a cylindrical shape in the figures in the illustrated exemplary embodiment, the invention is not limited thereto, and the cover 33 may have various types of shapes.

Further, the material of the cover 33 can be changed in design in accordance with the material of the support 31 or an amount of thermal expansion.

The height adjustment module 30 may include the cover 33, as in an exemplary embodiment shown in FIGS. 4 and 6, but the height adjustment module 30 may include only the support 31 and the heating unit without the cover 33 in another exemplary embodiment as shown in FIG. 5.

Even though not shown in the figures, the controller may be provided to give a control order to the power unit included in the heating unit.

In detail, the controller calculates an amount of an increase in temperature in accordance with an amount of an increase of a length or a volume of the support 31 to be made, using the thermal expansion coefficient of the material of the support 31, and then transmits a calculated temperature amount to the power unit.

In an exemplary embodiment, when the material of the support 31 is Invar, a thermal expansion coefficient of the Invar is about 1.3 µm/(m·° C.), for example, such that a length increases by 0.13 µm per 1 degree Celsius (° C.), when a unit length of the support 31 is 100 millimeters (mm). Accordingly, the height is adjusted by about 1 µm every time the temperature of the heating unit increases by 7.7° C.

Since a plurality of height adjustment modules 30 may be provided in the illustrated exemplary embodiment, the controller may transmit the calculated temperature amount to the power unit in the heating unit of each of the plurality of height adjustment modules 30.

Figure 7:
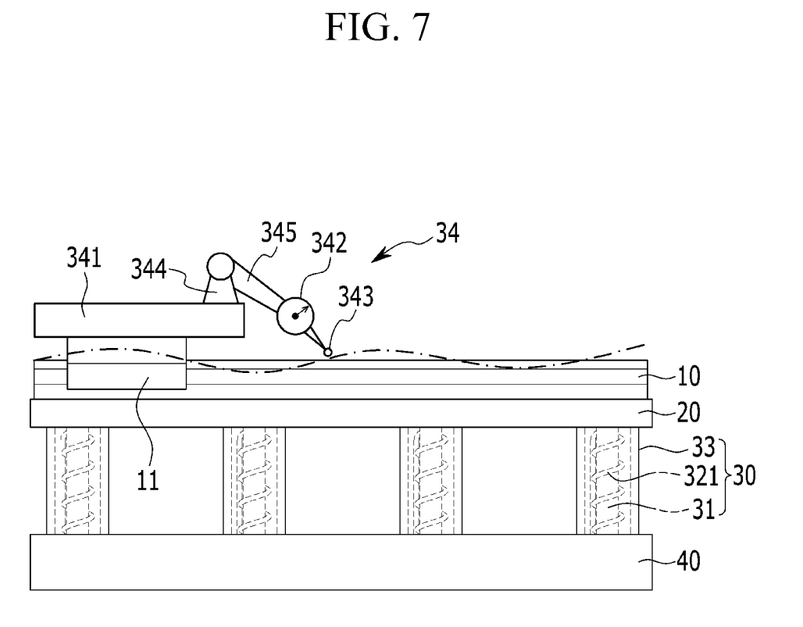
FIG. 7 is a cross-sectional view of the LM guide according to another exemplary embodiment of the invention, seen in the longitudinal direction.

FIG. 7 is a cross-sectional view of the LM guide according to another exemplary embodiment, seen in a longitudinal direction.

According to another exemplary embodiment, a height measuring unit 34 may be further included in the configuration of the illustrated exemplary embodiment.

The height measuring unit 34 measures a relative change in height of the guide rail 10 along an extension direction of the guide rail 10.

The height measuring unit 34 may be used to more precisely keep the straightness of the guide rail 10.

In the illustrated exemplary embodiment, the height measuring unit 34 may be a common contact gauge or a non-contact displacement sensor, which is deformable.

An exemplary embodiment where the height measuring unit 34 is a contact gauge will be described below in detail.

Referring to FIG. 7, the height measuring unit 34 of the illustrated exemplary embodiment may include a fixing part 341, first and second bars 344 and 345, a gauge 342, and a sensing probe 343.

First, the fixing part 341 fixes the first bar 344 which will be described below in detail.

Although the fixing part 341 is disposed on the block 11 and moves with the block 11 on the guide rail 10 in the illustrated exemplary embodiment, the invention is not limited thereto.

The first bar 344 fixed to the fixing part 341 is hinge-connected to the second bar 345. The second bar 345 can be pivoted by the hinge connection.

The gauge 342 and the sensing probe 343 may be separately coupled to an end of the second bar 345.

The gauge 342 measures an angle from a surface contacted by the sensing probe 343, when the sensing probe 343 moves on the guide rail 10, and when the angle changes, the gauge 342 transmits the change to the controller of the height adjustment module 30.

The controller allows adjustment of the height of the support 31 at a section where the change in angle is sensed.

Therefore, more fine and precise adjustment of the height of the guide rail 10 is possible.

While this disclosure has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A linear motion guide, comprising:
   a guide rail disposed on a floor;
   a block movably mounted on the guide rail;
   a height adjustment module disposed between the guide rail and the floor,
   wherein the height adjustment module comprises:
      a support disposed on the floor to support the guide rail; and
      a heating unit which heats the support,
      wherein a gap between the floor and the guide rail is adjusted as the support is thermally heated by the heating unit.

2. The linear motion guide of claim 1, further comprising a support plate which supports the guide rail and is disposed under the guide rail.

3. The linear motion guide of claim 1, wherein a plurality of height adjustment modules are provided and arranged at predetermined intervals along a longitudinal direction of the guide rail.

4. The linear motion guide of claim 1, wherein the support has a cylindrical shape.

5. The linear motion guide of claim 4, wherein the support includes at least one of Invar, Superinvar, Kovar and Inconel.

6. The linear motion guide of claim 1, wherein the heating unit includes a coil disposed around the support.

7. The linear motion guide of claim 6, wherein the height adjustment module further comprises a cover which covers the support and the coil to prevent heat transferred from the coil to the support from being dissipated to an outside.

8. The linear motion guide of claim 6, wherein the coil winds around the support.

9. The linear motion guide of claim 1, wherein
the height adjustment module further comprises a controller that is configured to calculate a change in the length of the support using a volume of the support, a thermal expansion coefficient of the support and an information on an increase in temperature of the heating unit.

10. The linear motion guide of claim 9, further comprising a height measuring unit which is disposed on the block and measures a change in a height between the floor and the guide rail along an extension direction of the guide rail.

11. The linear motion guide of claim 10, wherein the height measuring unit comprises at least one of a contact gauge and a non-contact displacement sensor.

12. The linear motion guide of claim 11, wherein the height adjustment module adjusts the length of the support at a section where the height changes, using the change in the height measured by the height measuring unit.

13. The linear motion guide of claim 12, wherein the height measuring unit further comprises:
 a fixing part which is disposed on the block and moves with the block on the guide rail;
 a first bar which is fixed to the fixing part and which is hinge-connected to a second bar which is pivoted by the hinge connection;
 the contact gauge and a sensing probe which are separately coupled to an end of the second bar.

14. The linear motion guide of claim 13, wherein the contact gauge measures an angle from a surface contacted by the sensing probe, when the sensing probe moves on the guide rail.

15. A method for adjusting a height of a guide rail in a linear motion guide, the method comprising:
 disposing the guide rail on a floor;
 disposing a block on the guide rail;
 disposing a height adjustment module including a support, between the guide rail and the floor, and
 heating the support,
  wherein a gap between the floor and the guide rail is adjusted as the support is thermally heated.

* * * * *